May 10, 1966 R. G. BOENING 3,250,851

UNIVERSAL TRANSISTOR MOUNTING PAD

Filed June 22, 1964 3 Sheets-Sheet 1

INVENTOR
Rolf G. Boening

BY
Stevens, Davis, Miller & Mosher
ATTORNEYS

INVENTOR
Rolf G. Boening

BY
Stevens, Davis, Miller & Mosher
ATTORNEYS

May 10, 1966 R. G. BOENING 3,250,851

UNIVERSAL TRANSISTOR MOUNTING PAD

Filed June 22, 1964 3 Sheets-Sheet 3

INVENTOR
Rolf G. Boening

BY
Stevens, Davis, Miller & Mosher
ATTORNEYS

United States Patent Office 3,250,851

Patented May 10, 1966

3,250,851

UNIVERSAL TRANSISTOR MOUNTING PAD

Rolf G. Boening, Fort Lauderdale, Fla., assignor to Systems Engineering Laboratories, Inc., Fort Lauderdale, Fla., a corporation of Florida Filed June 22, 1964, Ser. No. 376,975
8 Claims. (Cl. 174—138)

This invention relates to a transistor mounting pad and more particularly a transistor mounting pad which is substantially universal in utility so that the disclosed transistor pad can be used with various sized transistors to perform various functions therefor.

The conventional transistor pad was created to meet the growing needs of electronic industry which demanded quicker, more reliable, and easier assembly of printed circuit boards which comprise a plurality of transistors. However, it is at present common practice to use different size transistor pads for corresponding size transistors. Furthermore, the particular transistor pad construction must be matched to the corresponding mounting area on the printed circuit board, whereby the holes in the pad match the holes in the printed circuit board.

Therefore, it was necessary to have many different sizes of transistor pads with different holes spacing to correspond to the different size transistors which had to be mounted at a circuit location on the printed circuit board. To alleviate errors and wasted time in matching the transistor pads to the particular corresponding transistor, the transistor pads were color coded, the pad color representing the size or hole spacing.

It is a purpose of the present invention to provide a transistor pad which avoids the aforementioned problems by providing a transistor pad that is universal because of its physical construction so that said pad can be used with almost any size transistor.

It is another object of the present invention to provide a transistor pad which provides versatility by filling the mounting needs for most transistor lead spacing and arrangements.

It is yet another object of the present invention to provide a transistor pad which comprises channels that aid the guiding of transistor leads in the horizontal plane.

It is still another object of the present invention to provide a transistor pad comprising spacing members which cause the transistor pad to be equally spaced from the printed circuit board on which said pad is mounted.

Other and further objects of the present invention will become apparent with the following detailed description when taken in view of the appended drawings in which.

Figures 1, 2, 3:
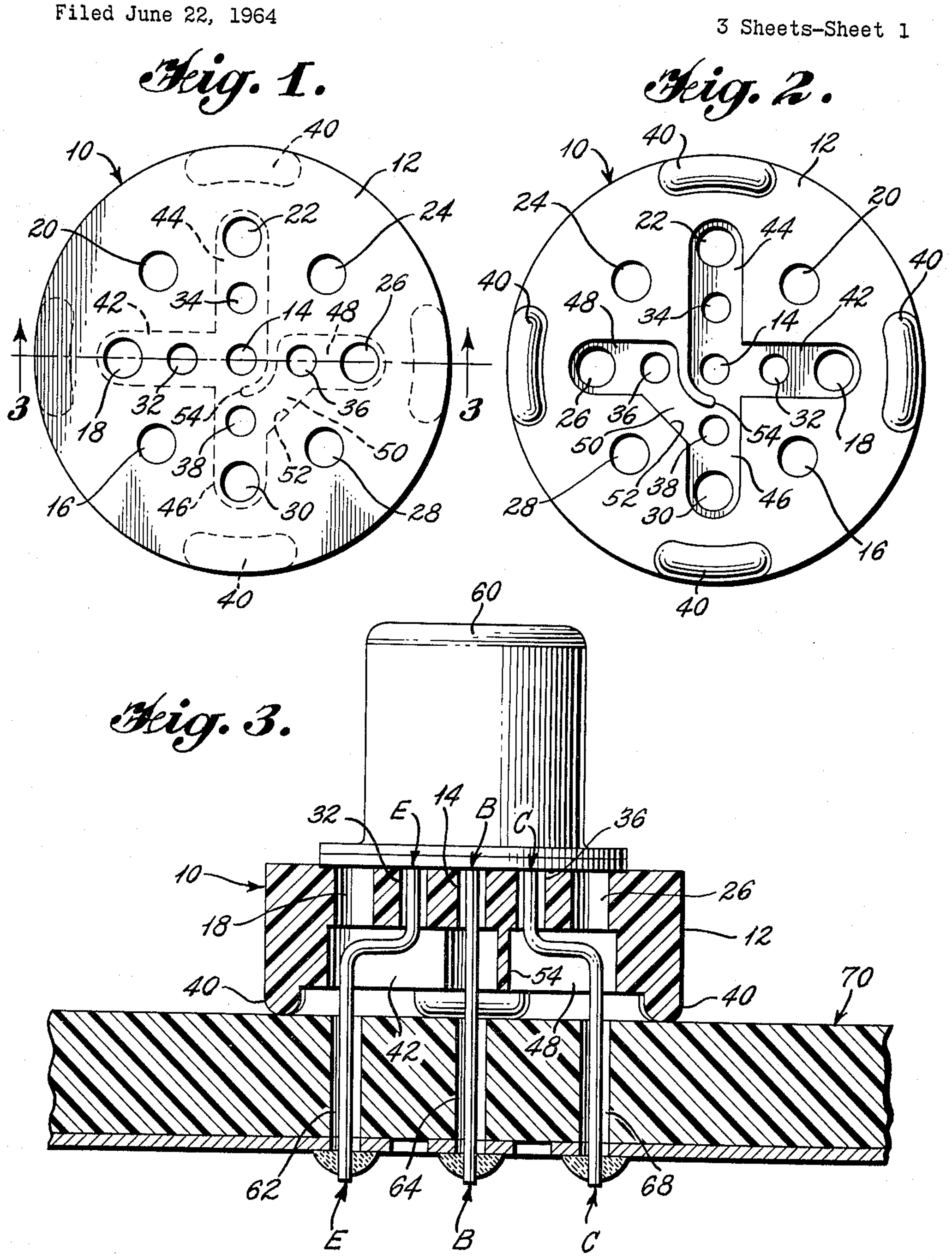
FIG. 1 is a top plan view of the transistor pad which forms the present invention.
FIG. 2 is a bottom plan view of the present invention.
FIG. 3 is a vertical sectional view taken along line 3—3 of FIG. 1 showing the transistor pad in its cooperating relationship with the transistor to be mounted and the printed circuit board.

Referring now to FIG. 1, there is illustrated a transistor pad generally indicated as 10 having a cylindrical body 12. The transistor mount 10 can be made of plastic, ceramic, rubber, or the like and preferably has a diameter of approximately thirty-five one hundredths (0.35) of an inch.

The transistor mount has a center communicating hole 14 and a plurality of holes 16, 18, 20, 22, 24, 26, 28 and 30 spaced equally and symmetrically about central hole 14. By way of example, holes 16–30 are spaced approximately $\frac{1}{10}$ of an inch from central communicating hole 14. A ring of inner holes 32, 34, 36 and 38 are radially in line with holes 18, 22, 26 and 30, respectively, and are all spaced approximately 0.05 of an inch from central hole 14. Holes 14, 32, 34, 36 and 38 are preferably of smaller diameter than the remaining outside holes because of their contemplated use with smaller leads of smaller transistors.

Referring now to the bottom plan view of FIG. 2, the bottom of the device 10 comprises four depending spacing members 40 mounted substantially at the periphery of the body 12 and having arcuate configurations. Spacing members 40 function to insure proper spacing between the bottom of the transistor mount and at the printed circuit assembly board, whereby (1) a free circulation of air or ventilation between printed circuit board and the transistor mount is provided in conjunction with the channels and holes described herein below and (2) a more resilient mount is provided so that the transistor lead stress under shock and vibration is lowered.

The bottom of the body 12 defines a pair of communicating channels 42 and 44 disposed at right angles and communicating with central hole 14. Said channels have a depth or vertical dimension equal to substantially $\frac{1}{2}$ the vertical dimension of body 12. (See FIG. 3.) The channels 42 and 44 are elongated in a radial direction and the floor of said channels (as seen from the bottom plan view) provides a terminal plane for communicating holes 14, 18, 22, 32 and 34.

The bottom of body 12 also defines two additional elongated channels 46 and 48, the vertical dimensions of which are preferably equal to the vertical dimensions of channels 42 and 44. The floors of channels 46 and 48 (as seen from the bottom plan view) provide a terminal plane for communicating holes 28, 30, 36 and 38. Furthermore, channel 46 communicates with channel 48 through an oblique channel 50 which is disposed substantially at a 45° relationship to the axes of elongated channels 46 and 48. One side of channel 50 is defined by an angular wall 52 and the other side by a blocking dike or finger-shaped wall 54. Wall 54 is also slightly arcuate. The base of finger wall 54 is integral with the bottom of cylinder 5, and the terminal part of the finger extends to the colineal axes of channels 46 and 44.

Therefore, in this way, channel 48 has lead communication only with channel 46. Wall 54 functions to prevent lead shorting between leads in channel 50 and any lead in hole 14. If it is desired to have lead communication between channel 44 and channel 46, the lead can take a path between the tip of finger wall 54 and the side wall of channel 46. If the transistor lead is of a greater diameter than the spacing between the tip of finger wall 54 and the side wall of channel 46, the lead can be easily forced therethrough and the tip of dike 54 will be slightly distorted or broken. This feature enables a lead reversal from channel 44 to channel 46 without, for example, reversing the leads or withdrawing the leads previously mounted in communicating holes 36 and 32 or 26 and 18, respectively.

Therefore, there is provided a transistor mount which allows lead communication between selected channels whereby the leads are extended through the holes in the top surface as shown in FIG. 1 depending on the size of the transistor, and the leads are appropriately bent or otherwise caused to lie in the various communicating channels 42, 44, 46 and 48 depending on the requirements of the printed circuit board.

Referring to FIG. 3, there is illustrated one example of a transistor mounted to a printed circuit board in combination with the present invention. Let it be assumed that transistor 60 has $\frac{1}{10}$ inch lineal leads and is to be mounted in a $\frac{2}{10}$ inch lineal lead printed circuit connection. The emitter base collector leads of transistor 60 are first inserted to communicating holes, for example, 32, 14 and 36. The emitter and collector leads are then bent outwardly toward the ends of communicating channels 42 and 48, respectively. The leads are then mounted through holes 62, 64 and 68 of the printed circuit board 70 which are 2/10 inch linear spaced holes.

The spacing members 40 provide proper resilient support, proper ventilation, while the transistor mount can, as a whole, prevent soldering damage by supporting the transistors a uniform distance above the boards and acting as a heat insulator. The emitter, base and collector leads are then cut and soldered in the conventional manner.

It can be seen that the transistor mount can provide for proper insulation in case the printed circuit board 70 has printed circuitry on both sides thereof.

Referring now to FIGS. 4*a* through 10*b*, there is illustrated various examples of the utility of the present invention.

Figure 4A:
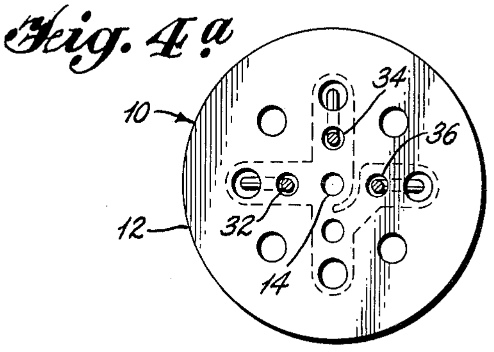
FIGS. 4*a* to 10*b* illustrate several examples of the utility of the device.
Figure 4B:
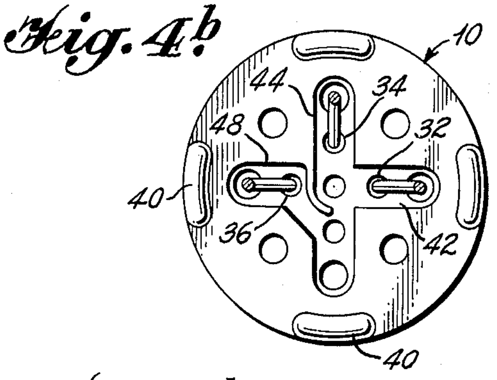
Figure 5A:
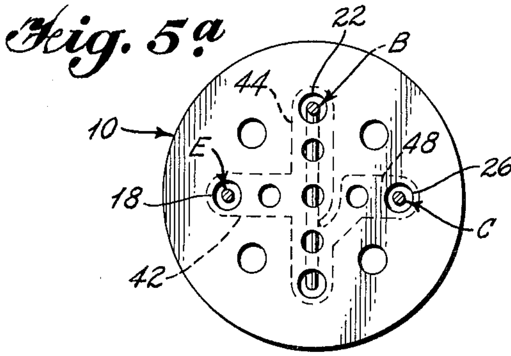
Figure 5B:
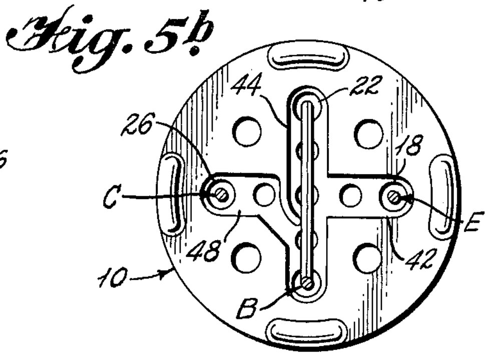
Figure 6A:
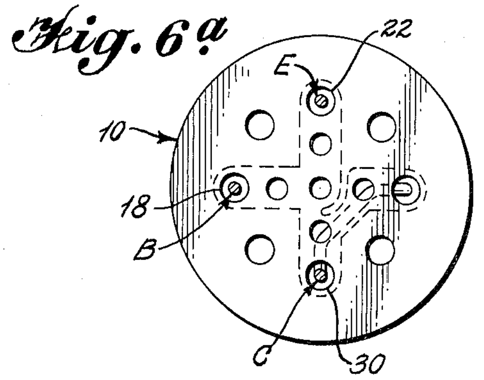
Figure 6B:
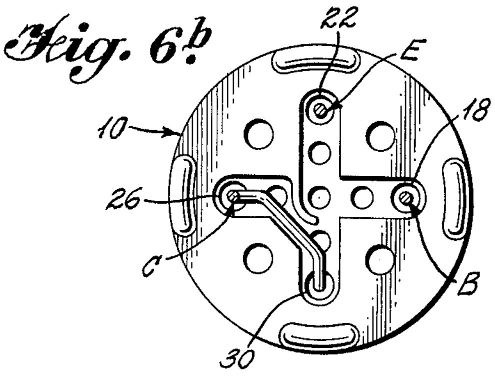

FIGS. 4*a* and 4*b* illustrate how a 1/10 inch diameter lead spacing is adapted to be mounted in a standard 2/10 inch diameter spacing circuit board.

Figure 7A:
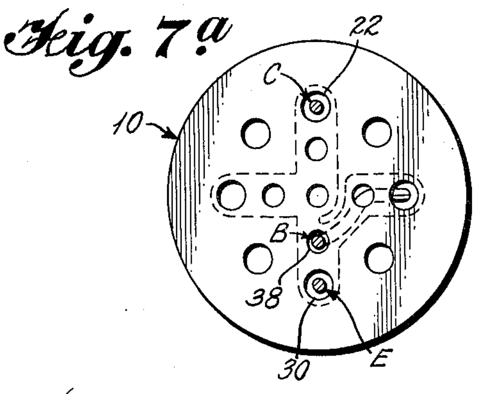
Figure 7B:
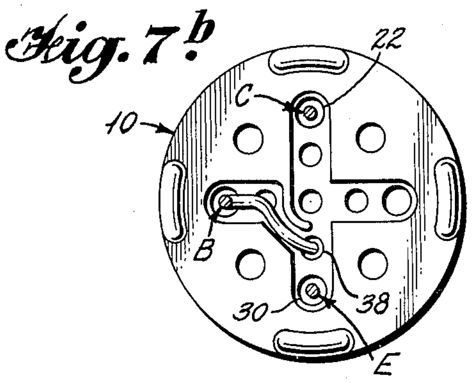
Figure 8A:
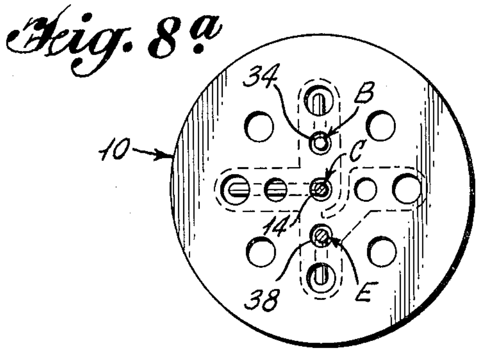
Figure 8B:
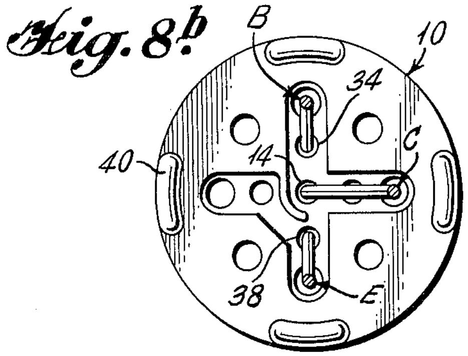
Figure 9A:
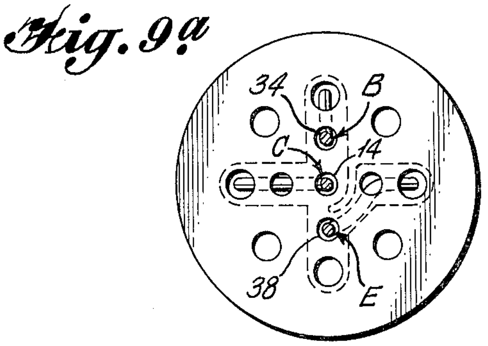
Figure 9B:
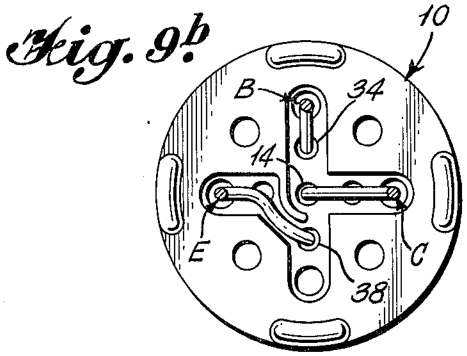

FIGS. 7*a* and 7*b* illustrate how a conventional 2/10 inline lead spacing can be mounted in a standard 2/10 inch diameter lead spacing package.

FIGS. 5*a*, 5*b*, 6*a*, 6*b*, 8*a*, 8*b*, 9*a* and 9*b* illustrate other examples of the flexibility and usefulness of the present invention. It can be seen that printed circuits can be layed out with all transistor leads having a 2/10 inch diameter lead spacing (standard), because the present invention will enable the mounted transistor leads to be quickly and easily adapted to this standard spacing. Therefore, the present invention enables the printed circuit layout to be simplified and enables transistors with odd or unconventional lead configuration to be mounted in a standard 2/10 inch diameter lead configuration or enables transistors with standard lead configuration to be mounted on circuits requiring non-standard lead configuration.

Figure 10A:
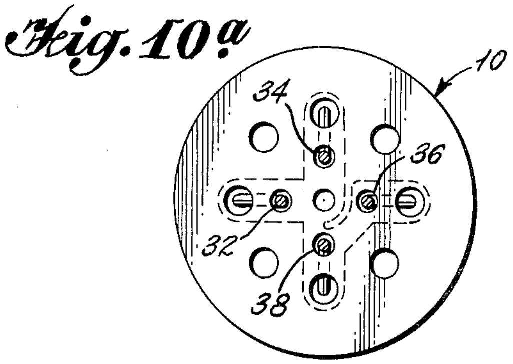
Figure 10B:
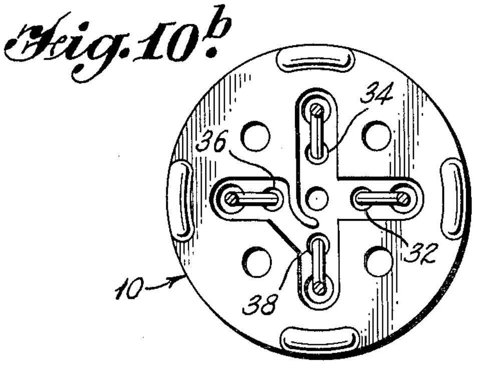

The present invention also enables devices with up to eight leads to be mounted on a 2/10 inch diameter lead spacing circuit. For example, FIGS. 10*a* and 10*b* illustrate how a 1/10 inch diameter lead spacing utilizing four leads is adapted to be mounted with a 2/10 inch diameter lead spacing.

Therefore, there has been described a versatile and universal transistor mount which will reduce time in mounting electrical components to printed circuit boards. Furthermore, it can be seen that a transistor can be mounted to the transistor pad at a separate assembly station because its type of mount will not depend upon the needs of the printed circuit board. Only when the transistor is to be immediately installed in the printed circuit board is it necessary to make a determination of what diameter or configuration the leads of the transistor is to have. At that time, the leads can be bent to the proper diameter or through the communicating lead channels so that the proper requirements of the printed circuit board can be met.

It is to be further understood that the terms "top" and "bottom" have not been used in a limiting sense and should be read in view of structural relationships.

It is apparent that further obvious modifications can be made to disclose the device without departing from the spirit of the present invention. Therefore, the scope of the present invention should only be limited by the scope of the appended claims.

What is claimed is:

1. A transistor mounting pad comprising a body having two substantially parallel surfaces, a plurality of holes extending through said body, at least two channels defined in one of said surfaces and each having a depth dimension less than the dimension between said surfaces, said channels having a floor which comprises the terminal plane for at least a portion of said plurality of holes, and said channels communicating with each other to provide lead communication therebetween.

2. A transistor mounting pad as set forth in claim 1, further comprising spacing means mounted on one of said surfaces for providing proper spacing between its mounting surface and the board on which the mounting pad is to be mounted.

3. A transistor mounting pad comprising a body having two substantially parallel surfaces, a plurality of holes extending through said body, channel means defined in one of said surfaces, said channel means having a depth dimension less than the dimension between said surfaces of said body, and said channel means having a floor which defines a terminal plane for at least a portion of said plurality of holes whereby said channel means is in lead communication with said portion of said plurality of holes, and wherein said channel means comprises at least three elongated channels disposed in radial relationship and having their axes meeting at the center of said body, said body further comprising means for enabling lead communication between two of said channels and preventing lead communication between at least one of said two channels and the third channel.

4. A transistor mounting pad as set forth in claim 3, wherein said means enabling lead communication comprises an oblique channel communicating with said two channels and dike means defining at least one wall of said oblique channel.

5. A transistor mounting pad comprising a body having two substantially parallel surfaces, a plurality of holes extending through said body, channel means defined in one of said surfaces, said channel means having a depth dimension less than the dimension between said surfaces of said body, and said channel means having a floor which defines a terminal plane for at least a portion of said plurality of holes whereby said channel means is in lead communication with said portion of said plurality of holes, and wherein said channel means comprises four elongated channels having axes intersecting at the center of said body, at least two of said channels being coaxial, and oblique channel means communicating between one of said coaxial channels and one of the other said channels for enabling lead communication therebetween, said body further comprising dike means for preventing lead communication between said two channels communicating with said oblique channel and the remaining two channels.

6. A transistor mounting pad as set forth in claim 5, wherein said dike means comprises a finger wall extending into the path of said two coaxial channels and terminating to define a small passageway between the wall of one channel and the terminal end of said finger wall, whereby said passageway enables lead communication between said coaxial channels.

7. A transistor mounting pad as set forth in claim 6, wherein the floors of said channels line in a plane, one of said plurality of holes communicating with each of said channels through the respective floor thereof, and a central hole having its axis through the center of said body also terminating at said plane.

8. A transistor mounting pad as set forth in claim 7, wherein at least a portion of said plurality of holes extend between said two parallel surfaces of said body.

References Cited by the Examiner

UNITED STATES PATENTS

| | | | |
|---|---|---|---|
| 2,863,131 | 12/1958 | Carlzen et al. | 339—193 |
| 2,999,895 | 9/1961 | Smith | 174—138 |
| 3,184,536 | 5/1965 | Vincent | 174—138 |

FOREIGN PATENTS

| | | |
|---|---|---|
| 870,831 | 6/1961 | Great Britain. |

ROBERT K. SCHAEFER, *Primary Examiner.*

LARAMIE E. ASKIN, *Examiner.*